United States Patent
Kato et al.

(10) Patent No.: US 8,451,540 B2
(45) Date of Patent: May 28, 2013

(54) RETARDATION FILM

(75) Inventors: Kenji Kato, Tokyo (JP); Katsushige Hayashi, Tokyo (JP); Noriyuki Kato, Tokyo (JP); Haruaki Eto, Saitama (JP); Syoichi Nito, Saitama (JP)

(73) Assignees: MGC Filsheet Co., Ltd., Saitama (JP); Mitsubishi Gas Chemical Company, Inc., Tokyo (JP)

( * ) Notice: Subject to any disclaimer, the term of this patent is extended or adjusted under 35 U.S.C. 154(b) by 64 days.

(21) Appl. No.: 12/440,819

(22) PCT Filed: Sep. 11, 2007

(86) PCT No.: PCT/JP2007/068017
§ 371 (c)(1),
(2), (4) Date: Aug. 3, 2009

(87) PCT Pub. No.: WO2008/032848
PCT Pub. Date: Mar. 20, 2008

(65) Prior Publication Data
US 2010/0033825 A1 Feb. 11, 2010

(30) Foreign Application Priority Data
Sep. 15, 2006 (JP) .................................. 2006-251717

(51) Int. Cl.
*G02B 5/02* (2006.01)
*G02B 5/30* (2006.01)

(52) U.S. Cl.
USPC ...................................... 359/599; 359/489.07

(58) Field of Classification Search
USPC ................................ 359/489.01, 489.07, 599
See application file for complete search history.

(56) References Cited

U.S. PATENT DOCUMENTS

| | | | | |
|---|---|---|---|---|
| 5,711,589 A | * | 1/1998 | Oe et al. | 362/620 |
| 5,730,298 A | * | 3/1998 | Gernet et al. | 209/524 |
| 5,886,819 A | * | 3/1999 | Murata et al. | 359/488.01 |
| 6,099,135 A | * | 8/2000 | Oda et al. | 362/620 |
| 6,261,665 B1 | * | 7/2001 | Murata et al. | 428/143 |
| 6,579,946 B2 | * | 6/2003 | Chau | 525/214 |
| 6,727,050 B2 | * | 4/2004 | Hosokawa | 430/351 |
| 6,771,340 B1 | * | 8/2004 | Yoshimi et al. | 349/118 |
| 7,030,944 B2 | * | 4/2006 | Fujimoto | 349/64 |
| 7,054,049 B2 | * | 5/2006 | Murakami et al. | 359/256 |
| 7,128,952 B2 | * | 10/2006 | Murakami et al. | 428/1.3 |

(Continued)

FOREIGN PATENT DOCUMENTS

| | | | |
|---|---|---|---|
| EP | 1 469 328 A1 | 10/2004 | |
| JP | 2006-119632 | * | 5/2001 |

(Continued)

OTHER PUBLICATIONS

Nouh, "The Effect of UV Radiation on the Optical Properties of Cellulose Triacetate", Radiation Measurements, vol. 27, No. 3, pp. 499-503. 1997.*

(Continued)

*Primary Examiner* — Ricky D Shafer
(74) *Attorney, Agent, or Firm* — Ladas & Parry LLP

(57) ABSTRACT

Disclosed is a film suitable for improvement of luminance, contrast and view angle of a liquid crystal display. Specifically disclosed is a retardation film having a thickness of 30-500 μm, a light transmittance of not less than 85%, and an Nz factor of not less than 10.

3 Claims, 1 Drawing Sheet

U.S. PATENT DOCUMENTS

| | | | |
|---|---|---|---|
| 7,364,670 B2* | 4/2008 | Nishikawa et al. | 252/299.01 |
| 7,582,339 B2* | 9/2009 | Kim et al. | 428/1.3 |
| 7,820,295 B2* | 10/2010 | Kim et al. | 428/432 |
| 2006/0098147 A1* | 5/2006 | Murakami | 349/119 |
| 2006/0238684 A1* | 10/2006 | Kiya et al. | 349/118 |
| 2008/0284948 A1 | 11/2008 | Koishi et al. | |
| 2009/0016209 A1* | 1/2009 | Ikeda et al. | 369/284 |

FOREIGN PATENT DOCUMENTS

| | | | |
|---|---|---|---|
| JP | 2001-272538 | | 10/2001 |
| JP | 2005-114836 | * | 4/2005 |
| JP | 2005-221783 | * | 8/2005 |
| JP | 2006-215333 | | 8/2006 |
| WO | 2006/090617 A1 | | 8/2006 |

OTHER PUBLICATIONS

Patent Abstracts of Japan of JP 2001-272538 dated Oct. 5, 2001.
Patent Abstracts of Japan of JP 2006-215333 dated Aug. 17, 2006.
Supplementary European Search Report dated Feb. 28, 2012 for Application No. EP 07807421.8-2217.
Deng-Ke Yang & Shin-Tson Wu, "Fundamentals of Liquid Crystal Devices", 2006, pp. 208-209.

* cited by examiner

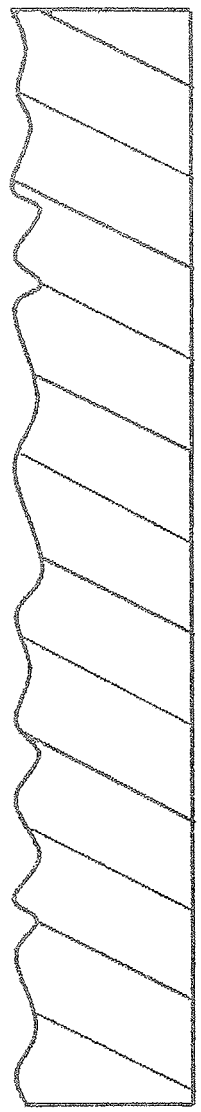

RETARDATION FILM

This application is a notional phase entry under 35 USC 371 of International Application PCT/JP2007/068017 filed on Sep. 11, 2007 and claims priority from Japanese patent application 2006-251717 filed on Sep. 15, 2006.

TECHNICAL FIELD

The present invention relates to a polymer film preferably usable for an element of liquid crystal displays (LCDs) and for an element of optical pickup devices. In more detail, the present invention relates to a film suitable to improve the luminance, contrast and viewing angle characteristic of liquid crystal displays.

BACKGROUND ART

Flat panel displays (FPDs) ranging from small displays to large displays are widely used today. Still now, it is pointed out that LCDs need to be improved in the contrast when seen in an oblique direction, the luminance uniformity, and the luminance itself.

Polymer films are conventionally used for STN (super twisted nematic) or other types of liquid crystal displays for the purpose of compensating for a phase difference so as to realize color compensation, viewing angle enlargement and the like. LCDs using thin film transistors (TFTs) have improved image quality as compared with the STN type LCDs, but still have the viewing angle problem that the image quality when seen in an oblique direction is different from the image quality when seen from the front. Therefore, for example, the retardation films are optimized to be used for such LCDs. Such retardation films are also used for reflection type LCDs in order to improve the contrast.

In accordance with the recent increase in the screen size, it is now indispensable to enlarge the viewing angle of LCDs. In addition to a demand to enlarge the viewing angle through technological development on LCD panels, there is a very strong demand to enlarge the viewing angle by use of a retardation film. Thus, a retardation film of a higher level of performance is desired.

One cause which declines the viewing angle characteristic of an LCD is an influence of the birefringence of the liquid crystal itself, which is exhibited when light passes through a LCD cell. When linear polarization provided by a polarization plate passes through the LCD cell, the polarization performance is not maintained and a part of the light leaks. Due to this, phenomena such as contrast decline, color tone change and the like, which are not favorable to display occur. What is required of a retardation film is to compensate for this variance in birefringence, which is caused depending on the viewing angle of the LCD.

Recently, vertical alignment nematic liquid crystal displays (VA-LCDs), IPS-LCDs, OCB-LCDs and the like have been developed in order to improve the viewing angle characteristic. These displays are realized as a result of development on the mode of the liquid crystal itself, which is made in order to enhance the contrast by enlarge the viewing angle of the display. However, in order to fulfill a recent need for a higher image quality with a wider viewing angle in a larger liquid crystal display, the function of a retardation film is indispensable. It is an important issue to obtain a large size of retardation film for a LCD, which has a uniform retardation value, a uniform delay axis direction, and good surface characteristics (durability against damage).

For realizing this, many retardation films have been proposed. For example, Japanese Laid-Open Patent Publication No. 2006-91246 proposes a retardation film which, when used in a liquid crystal display, does not change much the color tone of a displayed image and contributes to the enlargement of the viewing angle. Japanese Laid-Open Patent Publication No. 2004-117625 proposes a retardation film which, when stretched by a tensile force application, provides the following differential spectrum of infrared absorption before and after the stretching: the absorbance change ratio A of a carbonyl group stretched for 15 seconds to 1 hour, and the absorbance change ratio B of the carbonyl group stretched for 10 minutes to 1 hour, have the relationships of $1.2 \leq A \leq 2.0$ and $B \geq 1.1$.

Japanese Laid-Open Patent Publication No. 2005-77963 proposes that polycarbonate having a high refractive index, a low Abbe value, a high glass transition temperature (Tg), and a photo-elastic constant equal to or lower than a specific value is promising to produce a retardation film which has a high size stability against time and temperature change and does not change much the optical properties thereof against external stress.

However, these proposals do not clearly define the optical characteristics of the film and so are limited in applications. Especially, these proposals do not fulfill the recent demand for a display device providing a high image quality. Especially in order to fulfill the recent demand for a high level display, a retardation film having controlled refractive indices in three dimensions is important. Such refractive indices are appropriately defined by Nz factor. Nz factor=(nx−nz)/(nx−ny) (in the expression, nx and ny are each the main in-plane refractive index, and nz is the main thickness-direction refractive index.)

Several such retardation films having a controlled Nz factor have been proposed. For example, Japanese Laid-Open Patent Publications Nos. 2005-62673 and 2005-62671 each propose a retardation film having an Nz factor of 0.5 to 2.0. Japanese Laid-Open Patent Publication No. 2004-309617 proposes a retardation film having an Nz factor fulfilling $1.00 \leq$ Nz factor $< 1.35$. Japanese Laid-Open Patent Publication No. 2006-58540 proposes a retardation film having an Nz factor fulfilling $0.1 \leq$ Nz factor $\leq 0.9$.

All these retardation films have an Nz factor no more than 2. No retardation film having a larger Nz factor with more controlled molecular alignment has been proposed.

In the meantime, in order to improve the image quality of LCDs, it is necessary to improve the luminance and decrease the luminance nonuniformity. As a polymer film, a diffusion film or a diffusion sheet is used. The most important properties required of a diffusion film are to improve the luminance and to diffuse light or to conceal the nonuniformity pattern of the light source or behind the light source.

Conventionally for liquid crystal displays or the like, a surface light source called "edge light type backlight" is used. For a liquid crystal display using such a light source, an optical diffusion film for diffusing light emitted from the light source so as to make the image of the light source invisible is required.

Recently, optical diffusion films are desired to have an appropriate range of haze values and thus have a high optical diffuseness of diffusing light emitted from the light source uniformly on a liquid crystal panel, and also to have a high luminance, as well as a good light transmittance.

Examples of such an optical diffusion sheet include a sheet having an optical diffusion layer containing polymer beads or inorganic microparticles provided on at least one surface of the film (see Japanese Patent No. 2665301) and a sheet having a convex and concave pattern provided by embossing made on one surface or both surfaces of a transparent plastic film and also an optical diffusion layer containing microparticles on one surface or both surfaces thereof (see Japanese Laid-Open Patent Publication No. 11-337711).

DISCLOSURE OF THE INVENTION

As described above, in order to enlarge the viewing angle, it is preferable to use a retardation film, especially a retardation film having controlled refractive indices in three dimensions. For this purpose, a film having a defined Nz factor needs to be used. Conventionally, only retardation films having an Nz factor no more than 2 have been proposed, and no retardation film having a larger Nz factor with more controlled molecular alignment has been proposed.

As a result of active studies for solving the above problems, the present inventor found that unlike the retardation film currently used for LCDs, a film which is controlled such that the optical anisotropy is remarkably different between in the film plane and in the direction normal thereto has an Nz factor of 10 or larger. The present inventor also found that the viewing angle is enlarged by use of a film having such a large Nz factor.

The present inventor obtained the knowledge that a film having an Nz factor of 10 or larger has a higher performance of enlarging the viewing angle than the conventional films and so is suitable as a retardation film of vertical alignment (VA) LCDs or optical compensated bend (OCB) LCDs, and completed the present invention based on the knowledge.

A larger Nz factor means that the anisotropy of the molecular alignment is larger between in the film plane and in the direction normal thereto, and specifically means that the molecular alignment is highly controlled.

The present inventor also found that it is possible to provide an optical diffusion capability while maintaining this optical characteristic regarding the anisotropy. As a result, a film having a retardation film function and an optical diffusion function can be produced. Conventionally, the retardation film function and the optical diffusion function are provided by a plurality of films, but now can be provided by one film according to the present invention.

The present invention relates to a retardation film described below.

One embodiment of the present invention is directed to a retardation film having a thickness of 30 to 500 μm, a light transmittance of 85% or higher, and an Nz factor of 10 or larger.

$$Nz\ factor=(nx-nz)/(nx-ny)$$

(in the expression, nx and ny are each a main in-plane refractive index, and nz is a main thickness-direction refractive index.)

A preferable embodiment of the present invention is directed to the above-described retardation film having the optical diffusion function, wherein the film has a haze of 50% or higher. Another preferable embodiment of the present invention is directed to the above-described retardation film, wherein the film is formed of polycarbonate. Still another preferable embodiment of the present invention is directed to the above-described retardation film, wherein the film is produced by a melt extrusion method.

A retardation film according to a preferable embodiment of the present invention has a higher performance of enlarging the viewing angle than the conventional films, is capable of improving the contrast and allowing the thickness thereof to be decreased, and is especially preferable for mobile electronic devices or the like.

Moreover, the retardation film according to the present invention can be provided with an optical diffusion function without spoiling the retardation film function thereof. The retardation film function and the optical diffusion function, which are conventionally provided by a plurality of films, can be provided by one film according to the present invention.

BRIEF DESCRIPTION OF THE DRAWING

The drawing of FIG. 1 shows a retardation film having a convex and concave pattern on the surface thereof.

BEST MODE FOR CARRYING OUT THE INVENTION

Hereinafter, the present invention will be described in more detail.

As a retardation film, any film having a high light transmittance is usable with no specific limitation. A film having a light transmittance of 85% or higher and little alignment nonuniformity is preferably usable. Materials usable for such a film include, for example, polyesters such as polycarbonate, polyarylate, polysulfone, PET, polyethylene naphthalate and the like; polyolefins such as polyether sulfone, polyvinyl alcohol, polyethylene, polypropylene and the like; cellulose-based polymers; polystyrene; polymethyl methacrylate; polyvinyl chloride; polyvinylidene chloride; polyamide; norbornene-based polymers; and the like. Among these, polycarbonate is especially preferably usable.

Polycarbonate can be produced by a known method used for producing polycarbonate from a bisphenol and a carbonic acid ester forming compound. Polycarbonate can be produced by, for example, direct reaction of a bisphenol and a phosgene (phosgene method), transesterification reaction of a bisphenol and a bisarylcarbonate (transesterification method), or the like.

The bisphenols include, for example, 2,2-bis(4-hydroxyphenyl)propane (generally called "bisphenol A"), bis(4-hydroxyphenyl)methane; 1,1-bis(4-hydroxyphenyl)ethane; 2,2-bis(4-hydroxyphenyl)butane; 2,2-bis(4-hydroxyphenyl)octane; 2,2-bis(4-hydroxyphenyl)phenylmethane; bis(hydroxyaryl)alkanes such as 2,2-bis(4-hydroxy-1-methylphenyl)propane, 2,2-bis(3-methyl-4-hydroxyphenyl)propane, 2,2-bis(3,5-dimethyl-4-hydroxyphenyl)propane, bis(4-hydroxyphenyl)naphtylmethane, 1,1-bis(4-hydroxy-t-butylphenyl)propane, 2,2-bis(4-hydroxy-3-bromophenyl)propane, 2,2-bis(4-hydroxy-3,5-tetramethylphenyl)propane, 2,2-bis(4-hydroxy-3-chlorophenyl)propane, 2,2-bis(4-hydroxy-3,5-tetrachlorophenyl)propane, 2,2-bis(4-hydroxy-3,5-tetrabromophenyl)propane and the like; bis(hydroxyaryl)cycloalkanes such as 1,1-bis(4-hydroxyphenyl)cyclopentane, 1,1-bis(4-hydroxyphenyl)cyclohexane (generally called "bisphenol Z), 1,1-bis(4-hydroxyphenyl)-3,5,5-trimethylcyclohexane, and the like; bis(hydroxyaryl)sulfides such as bis(4-hydroxyphenyl)sulfide, and the like; and bis(hydroxyaryl)sulfones such as bis(4-hydroxyphenyl)sulfone, and the like.

2,2-bis(4-hydroxyphenyl)propane (generally called "bisphenol A") is especially preferable.

The carbonic acid ester forming compounds include, for example, bisarylcarbonates such as phosgene, triphosgene, diphenyl carbonate, di-p-tolyl carbonate, phenyl-p-tolyl carbonate, di-p-chlorophenyl carbonate, dinaphthyl carbonate, and the like. These compounds may be used in a combination of two or more.

Within the range of the object of the present invention, any of the following is usable together with any of the bisphenols mentioned above: tricyclo[5.2.1.02,6]decanedimethanol, cyclohexane-1,4-dimethanol, decalin-2,6-dimethanol, norbornanedimethanol, pentacyclopentadecanedimethanol, cyclopentane-1,3-dimethanol, 1,4-butanediol, 1,6-hexanediol, spiroglycol, isosorbide, isomannide, and the like.

A retardation film according to the present invention preferably has an Nz factor of 10 or larger, and especially preferably of 15 to 45. A film having an Nz factor of 10 or larger has a higher performance of enlarging the viewing angle than the conventional films and so is especially suitable as a retardation film of vertical alignment (VA) LCDs or optical compensated bend (OCB) LCDs. In order to provide a film with an Nz factor of 10 or greater, for example, the stretching ratio in the x direction is made larger than the stretching ratio in the z direction. Thus, the difference between nx and nz is increased and so the Nz factor can be made sufficiently large.

The retardation film according to the present invention can have a haze of 50% or higher by having a convex and concave pattern on at least one surface thereof. The surface pattern is preferably an emboss pattern, a V-groove pattern, a ridge pattern or the like which have a high optical diffuseness. An emboss pattern is especially preferable. By forming a convex and concave pattern on a surface of the film, the light transmittance and the haze can be adjusted to an arbitrary value, and so a desired optical diffusion performance can be provided.

The light transmittance is preferably 85% or higher, and especially preferably 87% or higher.

The haze is preferably 50% or higher, and especially preferably 65% or higher.

The resin film according to the present invention can be produced using a normal melt extrusion molding apparatus. A melted resin film melted by an extruder and discharged from the T-die is nipped by a first cooling roll having a rubber elasticity and a metallic second cooling roll having an embossed surface to form a convex and concave pattern on a surface of the film. The film is taken up by a metallic third cooling roll and a take-up roll provided downstream with respect to the first and second cooling rolls. The thickness of the film is preferably 30 to 400 μm, and more preferably 50 to 300 μm.

EXAMPLES

Hereinafter, the present invention will be described by way of examples. The present invention is not limited to the following examples in any way. The characteristics were evaluated as follows.

(1) Nz Coefficient

Retardation was measured by ellipsometer M220 produced by JASCO Corporation at a wavelength of 633 nm. The in-plane retardation Re was measured in the state where the film surface and the incident light were vertical to each other. Then, the thickness-direction retardation Rth was measured with a different angle between the film surface and the incident light. Thus, refractive indices in three dimensions nx, ny and nz were calculated. The Nz factor was calculated by the following expression.

$$Nz\ factor = (nx-nz)/(nx-ny)$$

(2) Total Light Transmittance and Haze

These were measured by haze meter HM-150 produced by Murakami Color Research Laboratory Co., Ltd.

(3) Viewing Angle Characteristic

A commercially available backlight, an iodine-based polarization plate, a retardation film, a liquid crystal cell, and a polarization light were located in this order from the bottom. The polarization plates were located such that the transmission axes thereof would cross each other at a right angle. The light from the backlight was visually observed at angle of incidence of 0 degrees and 45 degrees, and the viewing angle characteristic was determined as good or poor based on the presence/absence of light leakage.

(4) Optical Diffuseness

A point light source was observed through the film, and the diffuseness was determined based on how much the profile of the light source blurred. (Or, when the light source was observed through a light-guide plate and the film, it was confirmed that the dots of the light-guide plate were concealed.)

Example 1

A pellet of a polycarbonate resin (Iupilon E-2000 produced by Mitsubishi Engineering-Plastics Corporation) was dried at 120° C. for 3 hours by a hot air drier. The resultant pellet was melt-extruded at 270° C. by a 90 mm monoaxial extruder and a T-die. The extruded melted film was nipped by a silicone rubber first cooling roll having a diameter of 220 mm and a metallic second cooling roll having a diameter of 450 mm and having an embossed surface to form an emboss pattern on a surface of the film. The film was cooled, and then passed through a metallic third cooling roll having a mirror surface. Thus, a film having a thickness of 130 μm with one surface being embossed was produced while being taken up by a take-up roll. In this procedure, the temperature of the first cooling roll was set to 50° C., the temperature of the second cooling roll was set to 130° C., and the temperature of the third cooling roll was set to 130° C. The rate of the cooling rolls was set to 9.5 m/min. The evaluation results on the characteristics of the obtained film are shown in Table 1. By attaching the polycarbonate resin film according to this example, the viewing angle characteristic was improved and the optical diffuseness was sufficient.

Example 2

A pellet of a polycarbonate resin (Iupilon E-2000 produced by Mitsubishi Engineering-Plastics Corporation) was dried at 120° C. for 3 hours by a hot air drier. The resultant pellet was melt-extruded at 270° C. by a 90 mm monoaxial extruder and a T-die. The extruded melted film was nipped by a silicone rubber first cooling roll having a diameter of 220 mm and a metallic second cooling roll having a diameter of 450 mm and having an embossed surface to form an emboss pattern on a surface of the film. The film was cooled, and then passed through a metallic third cooling roll having a mirror surface. Thus, a film having a thickness of 75 μm with one surface being embossed was produced while being taken up by a take-up roll. In this procedure, the temperature of the first cooling roll was set to 60° C., the temperature of the second cooling roll was set to 135° C., and the temperature of the third cooling roll was set to 135° C. The rate of the cooling rolls was set to 16.0 m/min. The evaluation results on the characteristics of the obtained film are shown in Table 1. By attaching the polycarbonate resin film according to this example, the viewing angle characteristic was improved and the optical diffuseness was sufficient.

Example 3

A pellet of a polycarbonate resin (Iupilon E-2000 produced by Mitsubishi Engineering-Plastics Corporation) was dried at 120° C. for 3 hours by a hot air drier. The resultant pellet was melt-extruded at 270° C. by a 90 mm monoaxial extruder and a T-die. The extruded melted film was nipped by a silicone rubber first cooling roll having a diameter of 220 mm and a metallic second cooling roll having a diameter of 450 mm and having an embossed surface to form an emboss pattern on a surface of the film. The film was cooled, and then passed through a metallic third cooling roll having a mirror surface. Thus, a film having a thickness of 500 μm with one surface being embossed was produced while being taken up by a take-up roll. In this procedure, the temperature of the first cooling roll was set to 40° C., the temperature of the second cooling roll was set to 125° C., and the temperature of the third cooling roll was set to 125° C. The rate of the cooling rolls was set to 2.5 m/min. The evaluation results on the characteristics of the obtained film are shown in Table 1. By attaching the polycarbonate resin film according to this example, the viewing angle characteristic was improved and the optical diffuseness was sufficient.

Comparative Example 1

The film characteristics were evaluated in the same manner as in Example 1 on Lexan matt film 8A13 produced by GE.

Comparative Example 2

The film characteristics were evaluated in the same manner as in Example 1 on Lexan matt film 8B35 produced by GE.

Comparative Example 3

The film characteristics were evaluated in the same manner as in Example 1 on Panlite Film PC3555 produced by Teijin Chemicals, Ltd.

TABLE 1

| | Ex. 1 | Ex. 2 | Ex. 3 | Comparative ex. 1 | Comparative ex. 2 | Comparative ex. 3 |
|---|---|---|---|---|---|---|
| Film thickness (μm) | 130 | 75 | 500 | 180 | 130 | 180 |
| Re (nm) | 5 | 9 | 14 | 28 | 45 | 50 |
| NZ factor | 28 | 11 | 35 | 8 | 4 | 3 |
| Rth (nm) | 139 | 97 | 346 | 210 | 160 | 130 |
| Haze (%) | 78 | 71 | 55 | 86 | 93 | 90 |
| Total light transmittance (%) | 88 | 88 | 88 | 89 | 88 | 89 |
| Viewing angle characteristic | Good | Good | Good | Poor | Poor | Poor |
| Optical diffusibility | Good | Good | Good | Good | Good | Good |

INDUSTRIAL APPLICABILITY

A retardation film according to the present invention is preferably usable as an element of liquid crystal displays (LCDs) or as an element of optical pickup devices.

The invention claimed is:

1. A retardation film having a thickness of 30 to 500 μm, a light transmittance of 85% or higher, and an Nz factor of 15 to 45;

$Nz\ \text{factor} = (nx-nz)/(nx-ny)$, wherein nx and ny are each a main in-plane refractive index, and nz is a main thickness-direction refractive index, wherein the retardation film has a haze of 55% to 78% by having a convex and concave pattern on a surface thereof and a retardation Re of 5 to 14 nm.

2. The retardation film according to claim 1, wherein the film is formed of polycarbonate.

3. The retardation film according to claim 1, wherein the film is produced by a melt extrusion method.

* * * * *